United States Patent [19]

Croswhite

[11] 4,452,099
[45] Jun. 5, 1984

[54] THREE SPEED OVERDRIVE TRANSAXLE ASSEMBLY

[75] Inventor: Howard L. Croswhite, Thousand Oaks, Calif.

[73] Assignee: Ford Motor Company, Dearborn, Mich.

[21] Appl. No.: 293,549

[22] Filed: Aug. 17, 1981

[51] Int. Cl.³ .................... F16H 37/08; F16H 47/00; F16H 57/10

[52] U.S. Cl. ........................................ 74/695; 74/730; 74/759

[58] Field of Search ............... 74/677, 695, 730, 740, 74/758, 759

[56] References Cited

U.S. PATENT DOCUMENTS

| | | | |
|---|---|---|---|
| 2,281,077 | 4/1942 | Pollard | 74/189.5 |
| 2,325,876 | 8/1943 | Pollard | 74/189.5 |
| 2,932,220 | 4/1960 | Nash | 74/732 |
| 3,029,662 | 4/1962 | Hause | 74/695 |
| 3,078,740 | 2/1963 | Jandasek | 74/733 |
| 3,099,172 | 7/1963 | Jania et al. | 74/751 |
| 3,158,140 | 11/1964 | Moore | 74/759 X |
| 3,217,563 | 11/1965 | Simpson | 74/759 X |
| 3,339,431 | 9/1967 | Croswhite et al. | 74/688 |
| 3,354,746 | 11/1967 | Paredes | 74/688 |
| 3,411,382 | 11/1968 | Mori | 74/695 X |
| 3,491,621 | 1/1970 | Moan | 74/695 |
| 4,056,988 | 11/1977 | Kubo et al. | 74/695 |
| 4,223,569 | 9/1980 | Koivunen et al. | 74/695 X |
| 4,296,645 | 10/1981 | Jameson | 74/667 |
| 4,364,285 | 12/1982 | Morisawa et al. | 74/695 X |
| 4,368,649 | 1/1983 | Vahratian et al. | 74/695 |

FOREIGN PATENT DOCUMENTS

| | | | |
|---|---|---|---|
| 52-32460 | 11/1977 | Japan | 74/758 |
| 138494 | 12/1959 | U.S.S.R. | 74/688 |

Primary Examiner—Allan D. Herrmann
Assistant Examiner—Stephen B. Andrews
Attorney, Agent, or Firm—Donald J. Harrington; Keith L. Zerschling

[57] ABSTRACT

A hydrokinetic transaxle assembly for an automotive vehicle driveline comprising a planetary gear system arranged concentrically with respect to the axis of the axle shafts for the traction wheels, a hydrokinetic torque converter disposed about the axis of the engine driven shaft, a planetary overdrive gear unit disposed about the axis of the torque converter, a transfer drive arrangement between the output element of the overdrive gearing and the input elements of the planetary gear system, the overdrive gear unit being effective during each forward drive ratio of the planetary gear system thereby reducing hydrokinetic slip in the torque converter, the torque delivery path between the engine and the overdrive gear unit being concentric with respect to the torque converter.

4 Claims, 4 Drawing Figures

| Gear | | O.D. Unit | | | Main Gear Box | | | | | Ratio |
|---|---|---|---|---|---|---|---|---|---|---|
| | | $Cl_1$ | $B_1$ | $OWC_1$ | $Cl_2$ | $Cl_3$ | $B_2$ | $B_3$ | $OWC_2$ | |
| R | | | | X | X | | | X | | 2.17 |
| N | | | | X | | | | | | — |
| Low | M | X | | | X | | X | X | | 2.58 |
| | D | | | X | X | | | | X | |
| Low O.D. | | | X | | X | | | | X | 1.68 |
| Int. O.D. | | | X | | X | X | | | | 0.98 |
| Dir. O.D. | | | X | | X | X | | | | 0.65 |

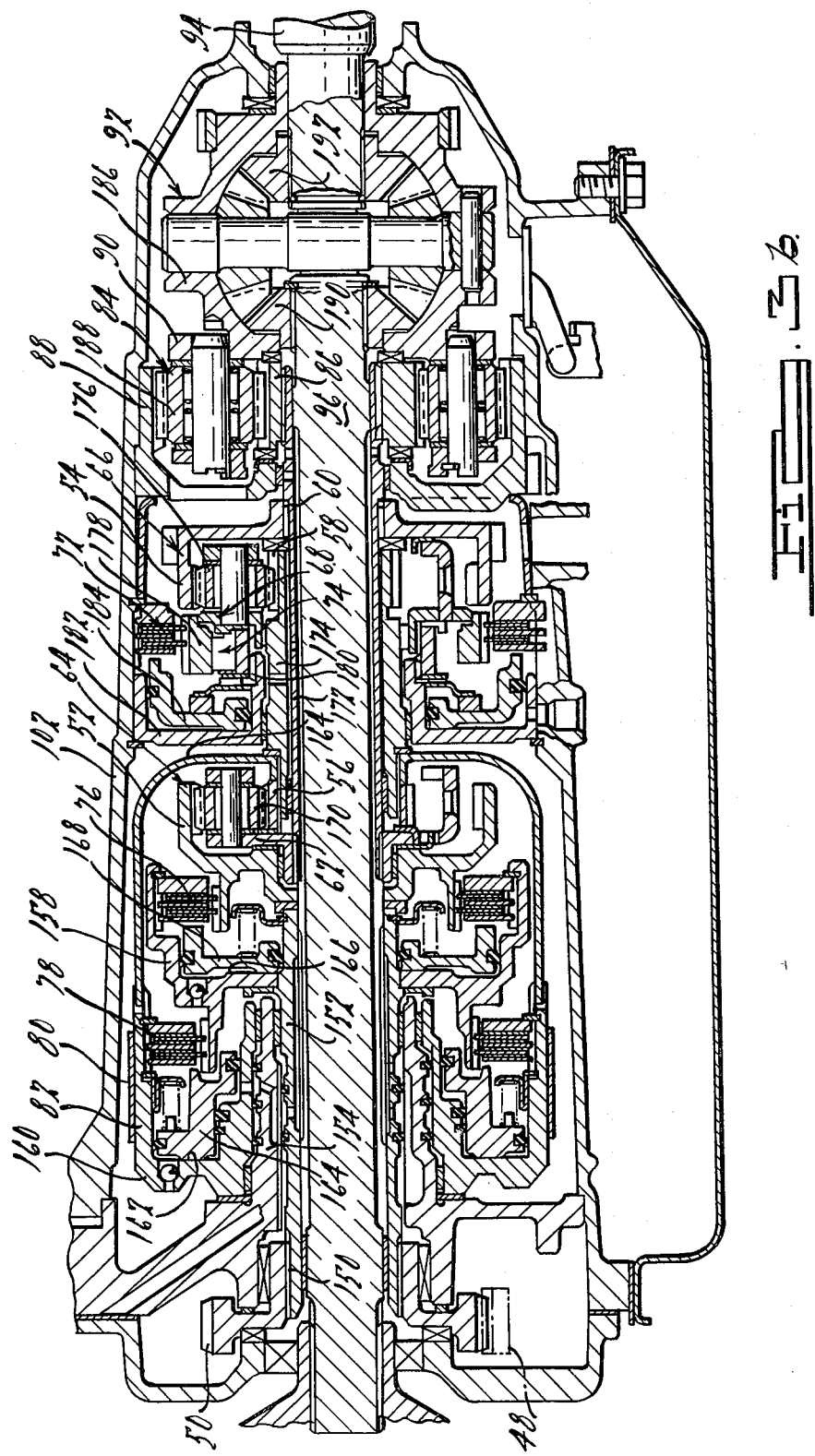

4,452,099

THREE SPEED OVERDRIVE TRANSAXLE ASSEMBLY

GENERAL DESCRIPTION OF THE INVENTION

My invention in an improvement in transmission arrangements of the kind shown in U.S. Pat. No. 3,339,431, issued to H. L. Croswhite and R. L. Leonard as co-inventors. It is an improvement also in the structures shown in U.S. Pat. Nos. 3,078,740 and 3,099,172. Each of the aforementioned patents is assigned to the assignee of this invention.

Each of the gear systems shown in the aforementioned prior art patents includes a hydrokinetic torque converter and a planetary gear system arranged co-axially with the input torque delivery axis for the conveter arranged in alignment with the output shaft of the gearing. They are adapted especially for drivelines for rear-wheel drive vehicles wherein the engine is mounted forwardly and the traction wheels are mounted rearwardly. Each of the prior art patents discloses a simple plantary gear unit acting in combination with the rotary elements of the converter to alter the ratios made available by the main gearing. In the case of U.S. Pat. No. 3,339,431, impeller torque is distributed through the simple planetary gear unit and the output element of the simple planetary gear unit is overdriven as it transfers torque to the input element of the main gearing. In the case of U.S. Pat. Nos. 3,078,740 and 3,099,172 the simple planetary gear unit is arranged to provide an overdrive between the engine and the impeller so that the impeller is overdriven with respect to the engine and the converter turbine functions in the usual fashion to distribute turbine torque to the input elements of the gearing. Other converter and overdrive gear unit combinations are shown in Pollard U.S. Pat. Nos. 2,325,876 and 2,281,077 and Voytech U.S. Pat. No. 2,260,846.

My present invention uses a preoverdrive concept. I have adapted the gear system to function in a cross drive or transaxle arrangement wherein the engine is mounted transversely and the traction wheels are mounted forwardly with respect to the vehicle chassis. The engine axis and the axis of the driving axles are arranged in parallel disposition in a common transaxle casing. Unlike the arrangements shown in U.S. Pat. Nos. 3,339,431; 3,078,740 and 3,099,172, for example, the engine driven torque input shaft for the transaxle is located concentrically with respect to the axis of the converter. In contrast the torque input path for the aforementioned prior art structures comprises a drive shell connected to the engine crankshaft driven driveplate and arranged to envelope the hydrokinetic torque converter. This arrangement of the prior art devices increases the complexity of the transmission assembly and uses excessive space.

My improved transmission mechanism makes it possible to use preoverdrive gearing in a transaxle configuration rather than an inline, rear-wheel drive configuration; and in doing so the impeller of the converter is driven by an input shaft that extends concentrically through the transmission axis without the necessity for the drive shell that extends around the impeller housing. A planetary gear set, which acts as a preconverter overdrive in my improved construction, is situated on the side of the converter remote from the engine; and the output element of the overdrive gear unit is connected through a transfer drive, such as a drive chain mechanism, to the input element of the main gearing located on a parallel axis arranged co-axially with respect to the driving axles.

Cross drives or transaxle arrangements using a torque converter and planetary gearing are shown in several prior art patents including Nash U.S. Pat. No. 2,932,220 and Kubu et al. U.S. Pat. No. 4,056,988. Another arrangement that includes transaxle gearing, but which does not include preoverdrive gearing, is shown in pending patent application Ser. No. 134,240 filed by G. E. Lemieux et al. on Mar. 26, 1980. That application is assigned to the assignee of this invention.

In addition to the advantages with respect to assembly space and packaging of my improved transaxle in a vehicle driveline, the preoverdrive gearing makes it possible to reduce the torque converter slip in comparison to prior art arrangements where full engine torque is applied to the converter. The overdrive gearing, which is located ahead of the torque converter, decreases the slip in each gear ratio at a given engine torque and speed. It is possible during operation in the lowest ratio in one driving mode for the overdrive unit to be rendered inactive thereby permitting a direct drive connection between the engine and the converter impeller thus allowing idling of the engine while the vehicle is stationary and permitting higher converter torque ratio for "breakaway" torque at the initial period of the acceleration mode. Because the load slip problem is largely solved by using the improvements of my invention, the converter may be designed to be smaller than normal thus lowering the total cost, the weight and the rotational inertia of the transmission elements. Furthermore, by permitting normal engine idle speed without the engine lugging that would be associated with a preovedrive gear system, smaller engine accessories and a smaller transmission oil pump may be used thereby reducing parasitic losses and improving the fuel economy. On the other hand if the designer chooses to use a lower engine idle speed and the engine and transmission are matched to accommodate such low idle speeds less fuel would be used and undesirable engine emissions would be reduced.

Since all of the driving torque must go through the torque converter in all gear ratios, the torque converter retains its effectiveness as the damper in the driveline as in the case of conventional torque converter transmissions. The engine may be loaded or lugged down for greater economy without causing undesirable low speed vibrations or shudder. The fully active converter makes the torque ratio of the converter available for acceleration thus improving the so-called performance of the driveline.

BRIEF DESCRIPTION OF THE FIGURES OF THE DRAWINGS

FIG. 3B is a partial cross-sectional assembly view of the same transmission assembly shown in FIG. 3A. FIGS. 3A and 3B are parts of the same cross-sectional assembly view.

PARTICULAR DESCRIPTION OF THE INVENTION

Figures 1, 2:
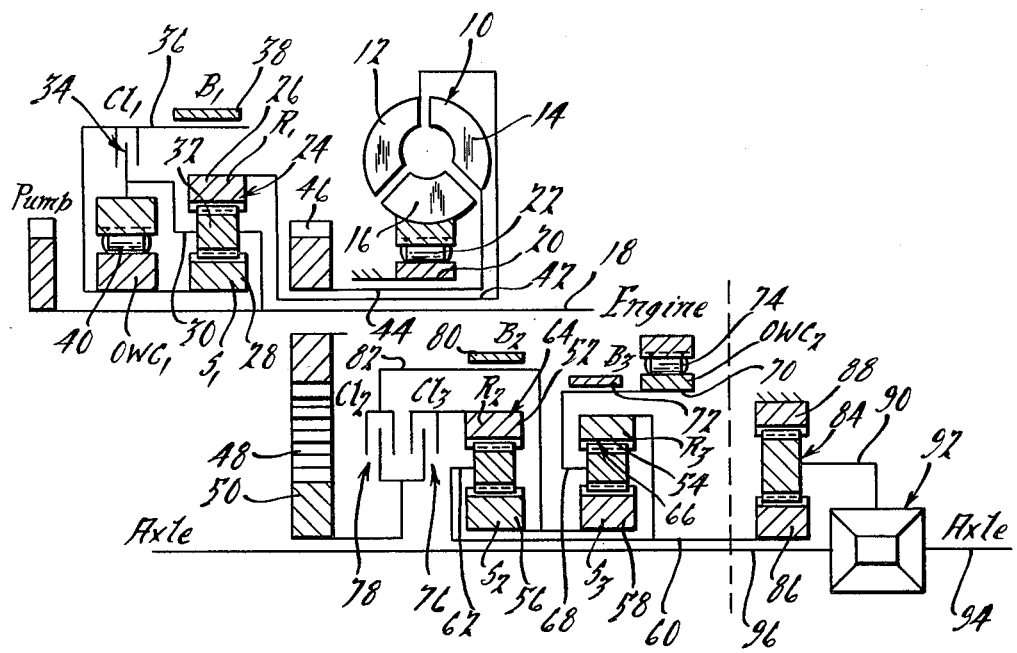
FIG. 1 is a schematic representation of a first embodiment of a transaxle arrangement having the improvements of my invention.
FIG. 2 is a chart that shows the engagement and release pattern for the clutches and brakes of the transmission shown schematically in FIG. 1.

FIG. 1, numeral 10, designates generally a hydrokinetic torque converter that comprises a bladed impeller 12, a bladed turbine 14 and a bladed stator 16. An engine driven shaft 18 is adapted to be connected to the crankshaft of an internal combustion engine. Bladed stator 16 is mounted on a stator shaft 20 connected to the stationary transmission housing. An overrunning coupling 22 anchors the stator against rotation in one direction during torque multiplication but permits freewheeling motion of the stator in the opposite direction during coupling operation of the converter.

An overdrive gear unit 24 is located on the outboard side of the converter 10. It includes a ring gear 26, a sun gear 28, planet carrier 30 and planet pinions 32 journalled on the carrier 30 in meshing engagement with the ring gear 26 of the sun gear 28. Friction clutch 34, which also carries the designation $CL_1$, is arranged to connect drivably the sun gear 28 and the ring gear 26 to provide a 1:1 ratio in the gear unit 24. A brake drum 36 is connected to sun gear 28. Brake band 38 surrounds the drum 36 and is applied to effect an overdrive ratio in the overdrive gear unit 24. Overrunning clutch 40 permits a so-called "pickup" shift between the 1:1 drive ratio in the gear unit 24 and the low-overdrive ratio as the brake band is applied. The clutch $CL_1$ permits torque delivery through the gear unit 24 in each direction to effect engine braking when that is desired.

Ring gear 26 is connected to a sleeve shaft 42 which in turn is connected to the impeller 12. Turbine 14 is connected to central turbine shaft 44.

Output gear or sprocket 46 is connected to the turbine shaft 44. It is connected by means of a drive chain 48 to a driven sprocket 50. If a drop gear arrangement is preferred instead of the drive chain 48, sprockets 48 and 50 can be replaced by driving and driven gear elements with an appropriate idler between them.

The final drive gearing comprises a so-called Simpson gearset similar to that shown in U.S. Pat. No. 3,339,431. It includes two identical gear units, each having a ring gear as shown at 52 and 54. Common such gears 56 and 58 are connected together for rotation in unison. Torque output sleeve shaft 60 is connected to carrier 62 of the first gear unit 64 of the Simpson gearset and to the ring gears 54 of the second gear unit 66 of the Simpson gearset. Carrier 68 of the second gear unit 66 is connected to brake drum 70 about which is positioned brake band 72. An overrunning brake 74 is adapted to anchor selectively the carrier 68 to effect low speed ratio operation of the main gearing. Brake band 72, which also is designated by the symbol $B_3$, is applied during reverse operation and during operation in low when engine braking is desired. Torque reaction is delivered from the carrier 68 to the transmission housing to the overrunning brake 74 during normal forward drive operation in the low speed ratio.

Sprocket 50 serves as a torque input element for the main gearing. It is adapted to be connected through clutch 76, also designated by the symbol $CL_3$, to the ring gear 52 of the gear unit 64 during operation in each of the forward driving ratios. Sprocket 50 is adapted to be connected through clutch 78, also designated by the symbol $CL_2$, to the sun gears 56 and 58 during operation in reverse and during operation with the main gearing acting in a 1:1 ratio. Brake band 80 is applied to brake drum 82 to anchor the sun gears during operation in the intermediate ratio. Brake band 80 is designated also by the symbol $B_2$.

Driven sleeve shaft 60 serves as a torque input element for final drive gearing 84 which comprises a sun gear 86 connected to the shaft 60. A stationary ring gear 88 is connected to the transmission housing and the carrier 90 is connected to a bevel pinion carrier for differential gear unit 92. Two axle shafts 94 and 96 are connected to output elements of the differential 92, axle shaft 96 extending through the main gearing and axle shaft 94 extending in the opposite direction generally in alignment with the axle shaft 96. The outboard ends of each axle shaft 94 and 96 are connected to vehicle traction wheels by a suitable universal joint coupling arrangement.

The chart of FIG. 2 shows a clutch and brake engagement and release pattern for the transaxle of FIG. 1. Brake $B_1$, designated by reference character 38 of FIG. 1, is applied during operation in each of the four driving ratios. Thus the overdrive gear unit is effective during operation in each forward drive ratio. If it is desired to allow the engine to idle freely, the brake $B_1$ is released and the clutch $CL_1$, designated by reference numeral 34 in FIG. 1, is applied thereby causing the overdrive gear unit 24 to lockup to perform with a 1:1 ratio.

In the main gearing clutch $CL_2$, designated also by numeral 78, is applied during operation in reverse and during operation in direct drive with the overdrive gear unit functional. This produces an overall ratio of 0.65:1 in a preferred embodiment. (This ratio as well as the others is indicated in the right column of the chart of FIG. 2.) Clutch $CL_3$, also designated by numeral 76, is applied during operation in each of the forward driving ratios.

Carrier 68 provides a reaction point during low speed ratio operation in the low range driving mode with the overdrive gear unit inactive. Torque reaction is delivered from the carrier 64 to the casing through the overrunning brake 74, designated also by the symbol $OWC_2$, during operation in the low ratio in the normal driving mode.

In FIG. 2 overrunning clutch 40 is designated by the symbol $OWC_1$, and it is effective when the overdrive gear unit 24 acts with the 1:1 ratio.

Figure 3A:
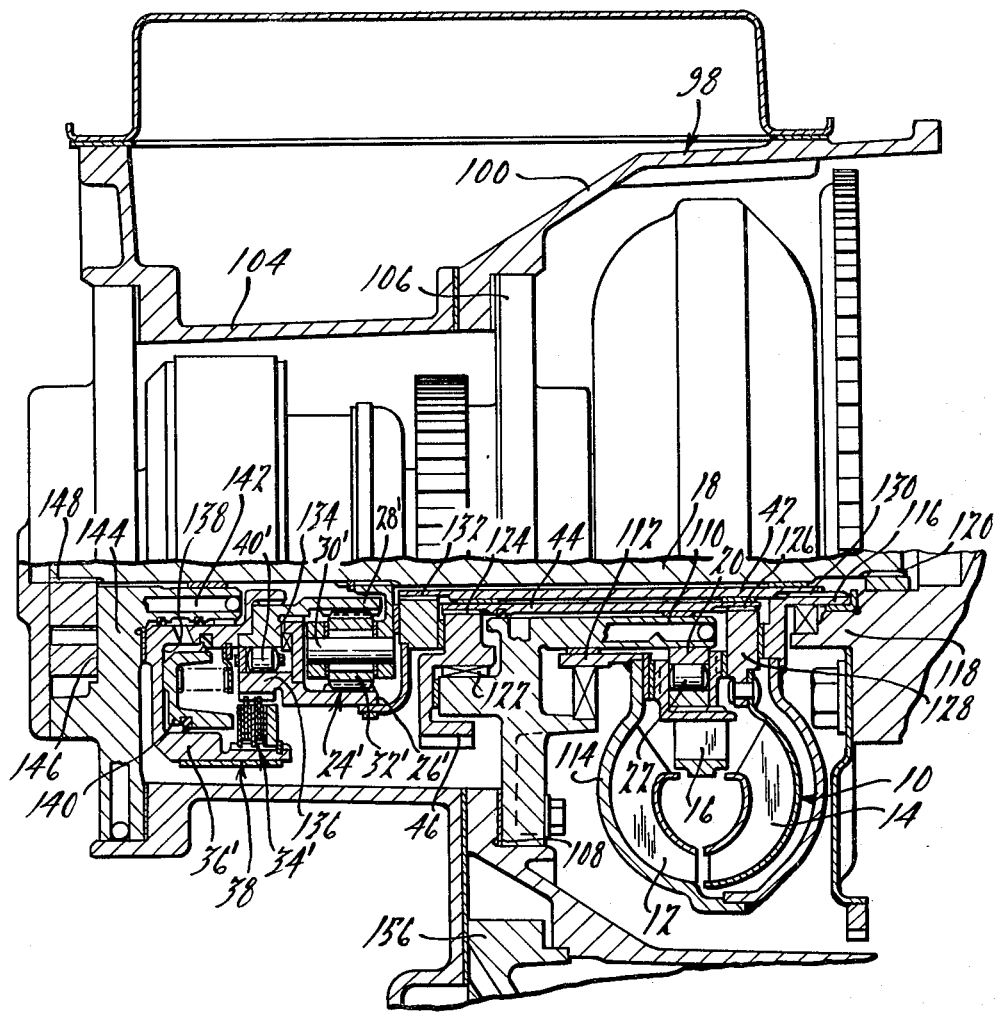
FIG. 3A is a partial cross-sectional assembly view of a preferred embodiment of a transmission structure schematically having the improvement of my invention.

In FIGS. 3A and 3B reference numeral 98 designates the unitary transmission housing. It includes a torque converter portion 100 and a main gearing portion 102. An end housing 104 contains the overdrive gear unit 24, the overdrive clutch 34 and the overdrive brake 38. The physical location of the overdrive gearing and the associated clutch and brake is such that it can be replaced with a modified gear unit to provide a different ratio or it can be replaced with a gear unit that does not have an overdrive characteristic. It is located in a separate housing portion that can be removed, and the alternate gearing and the alternate brake can be inserted thus providing a simple modification to the overall system. The basic manufacturing tooling thus can remain unchanged even though the drive characteristics of the transmission can be altered substantially depending upon the driveline requirements.

In FIG. 3A the overdrive gearing is modified to provide an overrunning coupling connection between the ring gear and sun gear rather than between the sun gear and the carrier, as in the embodiment of FIG. 1. In other respects the overdrive gearing of each embodiment is similar to that of the other. The function of the overdrive gearing of the embodiment of FIG. 3A, however, is the same as the function of the overdrive gearing of the embodiment of FIG. 1. The elements of the overdrive gearing of FIG. 3A that have counterpart elements in the embodiment of FIG. 1 have been designated in FIG. 3A by similar reference characters, although prime notations are added to the reference characters of FIG. 3A.

A support wall 106 is bolted to an internal shoulder 108 in the housing portion 100. It is formed with a stationary sleeve shaft 110 which provides a stator support for the inner race 20 of the overrunning brake 22. It provides also a bearing support for the hub 112 of the impeller shell 114. The other side of the impeller shell has a hub 116 that is piloted in an end opening in the crankshaft 118 of an internal combustion engine. Shaft 18 is splined at 120 to the crankshaft 118.

Torque transfer gear 46 is journalled at 122 on a bearing ring formed on the support plate 106. Gear 46 is splined at 124 to the turbine shaft 44, the latter being splined at 126 to the hub 128 of the turbine 14.

The impeller hub 116, which is splined at 130 to sleeve shaft 42 is connected to the carrier 30 of the overdrive gear unit 24 through the shaft 42, the ring gear 26 of the overdrive gear unit 24 being splined at 132 to the shaft 42. During overdrive operation sun gear 28 is adapted to be anchored by brake band 38. Overrunning clutch 40 provides a direct drive through gear unit 24 during operation in the first low drive mode. Clutch 40 includes overrunning brake race 134 and an overrunning brake outer race 136. Friction clutch 34, during coasting in the first low drive mode, transfers torque therethrough to the brake band 38.

Brake drum 36 defines an annular clutch chamber 138 in which is positioned annular piston 140 which engages the friction discs of the clutch 34 when pressure is admitted to the annular cylinder 138. Cylinder 138 is journalled on sleeve shaft 142 connected to end plate 144 which is secured to housing portion 104. Plate 144 also defines a positive displacement pump cavity 146 which has a gear element splined at 148 and driven by shaft 18.

Gear 50 forms a torque input element for the main gearing. It is splined at 150 to torque input sleeve shaft 152 which extends through and which is journalled on stationary sleeve shaft 154 on support wall 156 secured to the left hand end of the housing portion 102. The right hand end of the sleeve shaft 152 is connected to clutch member 158 which carries externally splined clutch discs of the clutch 76 and internally splined clutch discs of the clutch 78. Externally splined clutch discs of the clutch 78 are carried by clutch drum 160 which is journalled on the stationary sleeve shaft 154. If defines an annular cylinder 162 which receives an annular piston 164 which, when pressure loaded, engages the clutch discs of the clutch 73 thus establishing a driving connection between sleeve shaft 152 and the clutch drum 160, the latter being connected to sun gear 56 through drive shell 164. Clutch 76 and gear unit 64 are encircled by the drive shell 164. Ring gear 52 of the gear unit 64 carries internally splined discs of the clutch 76. Externally splined discs of the clutch 76 are carried by the clutch element 158, the latter defining an annular cylinder 166 into which is positioned an annular piston 168. When the piston 168 is pressure loaded, the discs of clutch 76 become applied thereby establishing a driving connection between the gear 50 and the ring gear 52. Clutch 76 is applied during operation in each of the forward driving ratios.

The carrier 62 of the gear unit 64 carries pinions 170 that mesh with the ring gear 52 and the sun gear 56 and it is connected through sleeve shaft 172 to the ring gear 54 of the gear unit 66. Sun gear 58 of the gear unit 66 and sun gear 56 of the gear unit 64 are joined by a common sleeve shaft 174. Carrier 68 of the gear unit 66 carries pinions 176 which mesh with ring 54 and sun gear 58. Carrier 68 is connected to the outer race 178 of the brake 74. The inner race of brake 74 is splined at 180 to annular cylinder 182 for the brake 72. Cylinder 182 contains annular piston 184; and when it is pressureized, the friction discs of brake 72 are applied thereby anchoring the race 178 to the housing portion 102. Brake 72 is applied during operation in manual (coasting) low and during reverse drive. The overrunning brake 74 provides a torque reaction delivery path to the housing 102 during operation in the low speed ratio and it freewheels at other times.

Ring gear 54 and carrier 62 are connected to the power output sleeve shaft 60 which is splined to sun gear 86 of the final drive gearing 84. Ring gear 88 of the final drive gearing is connected to and fixed to housing portion 102. Carrier 90 acts as a torque output element for the final drive gearing and is connected to the carrier housing 186 of the differential assembly 92. Pinions 188 which mesh with the ring gear 88 and the sun gear 86 are journalled on the carrier 90.

Carrier housing 186 carries differential pinions that engage drivably each of two side gears 190 and 192. These are splined respectively to the inboard ends of the axle shafts 96 and 94 respectively. Shaft 96 extends through the planetary gearing shown at a 64 and 68 and through clutches 76 and 78 in parallel disposition with respect to the axis of the converter 10.

By referring to FIG. 2 it may be seen that the overdrive gear unit is active during operation in each of the forward driving ratios so that it is effective to reduced converter slip during acceleration as well as during cruising in the overdrive range. The overdrive gear unit 24 is rendered active by applying the brake $B_1$, also designated by the numeral 38. If operation in manual low is desired the clutch 34 can be applied thereby locking up the gear unit 24 for operation with a 1:1 ratio. This increases the overall ratio and allows the converter to function normally. If continuous operation in the lowest ratio is desired (manual low), the clutch $CL_1$, also designated by numeral 34, can remain applied thus conditioning the transmission for coast braking. If it is desired to condition the transmission for an automatic 1–2 upshift, the clutch $CL_1$ can be released and the clutching function then is accommodated by the overrunning clutch 40. This condition is designated in the chart of FIG. 2 by the symbol low "D". With the overdrive gear unit 24 functioning and with both of the main gearing clutches 76 and 78 engaged, the overall ratio is 0.65 as indicated in FIG. 2. This is designated as direct "OD".

An overdrive intermediate "OD" ratio condition can be obtained by applying brake band 80 thereby anchoring the sun gears 56 and 58. With the sun gear 56 acting as a reaction point and with clutch 76 applied, torque from the sprocket 50 is delivered to the ring gear 52 which causes the carrier 62 to drive the sun gear 86 of the final drive gear unit 84.

The lowest speed ratio in the so-called overdrive range is obtained by applying brake 72 to anchor the carrier 68. With the sun gear 58 being driven and with the ring gear 52 being driven by the clutch element 158, the main gearing is locked up for operation in the 1:1 ratio and the sun gear 86 then is driven at the same speed as sprocket 50.

Reverse drive operation is obtained by applying brake 72, by releasing clutch CL$_1$ and applying clutch CL$_2$. This causes the ring gear 54 to be driven in a reverse direction as the carrier 68 acts as a reaction point.

In FIG. 3B the brake 72 is illustrated as a disc clutch although in the schematic representation of FIG. 1 brake 72 is a brake band. The functioning of the gearing of FIG. 3B, however, is the same as the functioning of the gearing of FIG. 1.

Since the overdrive is inactive during operation in the range designated as low "M" and low "D" and also in reverse drive, the torque converter behaves in the normal fashion allowing idling of the engine in gear and providing increased torque multiplication for acceleration purposes over a longer period of time during initial acceleration or breakaway of the vehicle from a standing start. Because this load-slip problem can be eliminated in this fashion without sacrificing the fuel economy advantages of an overdrive ratio in each of the forward driving gear ratios, the size of the converter may be reduced thereby lowering cost, weight and rotational inertia. Also, the fact that the engine operates freely at idle speed permits the use of smaller engine accessories and a smaller transmission oil pump. Thus further fuel economy gains can be enjoyed since these smaller vehicle components will produce less parasitic horsepower losses. If it is desired to maintain the same low engine idle speed that would be characteristic of a full size converter in the vehicle driveline, undesirable engine exhaust emissions can be reduced thus the driveline designer has several options that can be used with my improved transmission design depending upon the overall vehicle design objective.

Unlike some prior art preoverdrive transmission, the converter is effective in all forward driving ratios and thus it is capable of being used in the usual way as an effective driveline damper. It is possible then for the engine to be "lugged down" for greater fuel economy without causing an undesirable driveline shutter or resonant vibrations.

Having described a preferred embodiment of my invention, what I claim and desire to secure by U.S. Letters Patent is:

1. An overdrive transaxle driveline for an automotive vehicle having an internal combustion engine mounted with its principal axis in a transverse direction relative to the fore-and-aft axis of the vehicle;
    a hydrokinetic torque converter and an overdrive gear unit mounted on a first transverse axis and multiple ratio planetary gearing mounted on a second transverse axis parallel to the first transverse axis;
    a final drive gear unit and differential assembly;
    a first axle shaft extending concentrically through said main gearing and connected to one output element of said differential assembly;
    a second axle shaft aligned with said first axle shaft and connected to another output element of said differential assembly;
    an engine driven shaft extending concentrically through the torque converter;
    a transfer drive having a driving element located between said overdrive gear unit and said converter and mounted for rotation about the axis of said engine driven shaft, said transfer drive having a driven element mounted for rotation about the axis of said main gearing;
    said overdrive gear unit comprising a ring gear member, a sun gear member, a carrier member and planet pinions journalled on said carrier member in meshing engagement with said sun and ring gear members;
    said converter having an impeller connected to said ring gear through a sleeve shaft extending through said driving element;
    said converter having a turbine connected to said driving element through a turbine sleeve shaft extending concentrically through said converter; and
    clutch and brake means for selectively anchoring the sun gear member of said overdrive gear unit and for clutching two members of said overdrive gear unit together said clutch and brake means comprising a friction brake member connected to the sun gear of said overdrive gear unit, a friction clutch located between two members of said overdrive gear unit to render the overdrive gear unit inactive and to allow a direct driving connection between said engine driven shaft and the said impeller, and an overrunning clutch between said two members of said overdrive gear unit whereby said ring gear of said overdrive gear unit is overdriven when said friction brake member is braked as said overrunning clutch overruns.

2. The combination as set forth in claim 1 wherein said main gearing comprises planetary gear elements that are interconnected to establish three forward driving ratios and a single reverse driving ratio;
    clutch and brake means for selectively anchoring and clutching together elements of said main gearing to effect said driving ratios;
    said final drive gearing being mounted for rotation about the axis of said main gearing; and
    selectively engageable clutch means for connecting said driven element to each of two elements of said main gearing.

3. The combination as set forth in claim 1 wherein said main gearing comprises two simple planetary gear sets, each having a ring gear, a sun gear and a carrier;
    each carrier having pinions journalled thereon in meshing engagement with their respective sun and ring gears;
    the carrier of a first of said main gearing gear sets and the ring gear of the second being connected to an input element of said final drive gear unit;
    the sun gears of each gear set of said main gearing being connected together;
    brake means for anchoring the carrier of the second gear set of said main gearing during operation in the lowest ratio;
    first clutch means for connecting the driven element of said transfer drive to the ring gear of said first gear set of said main gearing;
    second clutch means for connecting the driven element of said transfer drive to the sun gears of said main gearing during high speed ratio operation and during reverse drive; and
    second brake means for anchoring the sun gears of said main gearing during operation in the intermediate speed ratio.

4. The combination as set forth in claim 2 wherein said main gearing comprises two simple planetary gear sets, each having a ring gear, a sun gear and a carrier;

each carrier having pinions journalled thereon in meshing engagement with their respective sun and ring gears;

the carrier of a first of said main gearing gear sets and the ring gear of the second being connected to an input element of said final drive gear unit;

the sun gears of each gear set of said main gearing being connected together;

brake means for anchoring the carrier of the second gear set of said main gearing during operation in the lowest ratio;

first clutch means for connecting the driven element of said transfer drive to the ring gear of said first gear of said main gearing;

second clutch means for connecting the driven element of said transfer drive to the sun gears of said main gearing during high speed ratio operation and during reverse drive; and second brake means for anchoring the sun gears of said main gearing during operation in the intermediate speed ratio.

* * * * *